(No Model.)
A. W. HALL.
BICYCLE.
No. 598,246.  Patented Feb. 1, 1898.
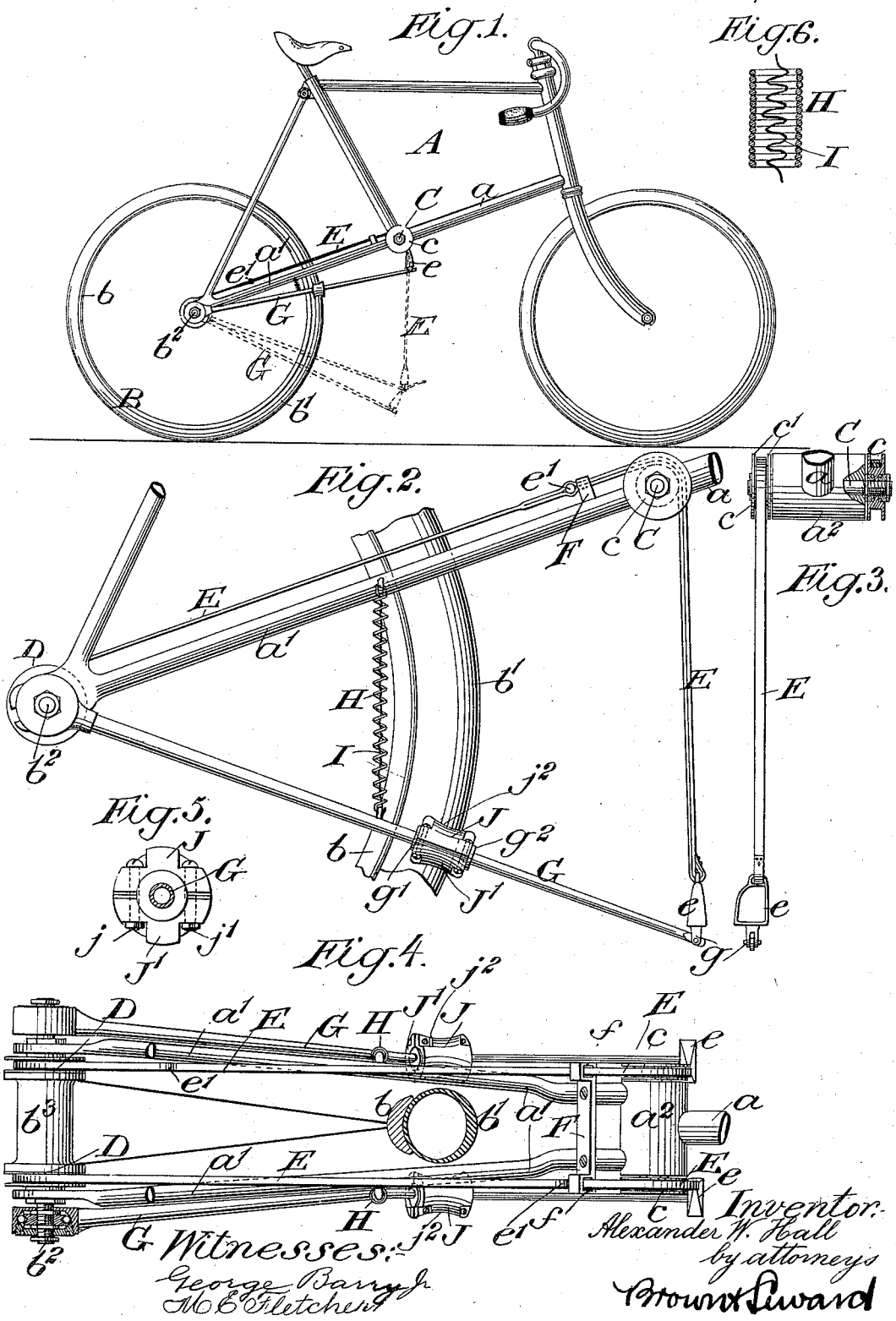
Witnesses:
George Barry Jr.
M. E. Fletcher
Inventor.
Alexander W. Hall
by attorneys
Brown & Seward

UNITED STATES PATENT OFFICE.

ALEXANDER W. HALL, OF NEW YORK, N. Y.

BICYCLE.

SPECIFICATION forming part of Letters Patent No. 598,246, dated February 1, 1898.

Application filed January 23, 1897. Serial No. 620,351. (No model.)

*To all whom it may concern:*

Be it known that I, ALEXANDER W. HALL, of the city and county of New York, in the State of New York, have invented a new and useful Improvement in Bicycles, of which the following is a specification.

My invention relates to certain improvements in bicycles, and more particularly to the mechanism employed for driving the same and for regulating its speed.

One object of my invention is to provide a driving mechanism which will be very simple in construction, strong, and one which will be capable of driving the bicycle at a high rate of speed with a minimum expenditure of force.

A further object is to provide means for effectually guarding against injury to the rider resulting from the breaking of the driving-strap.

A still further object is to provide counterbalanced guide-arms pivoted to the axle of the rear wheel to swing freely up and down, the free ends of the said guide-arms engaging the stirrups of the driving mechanism for guiding them in their upward and downward movements and preventing any undue lateral movements of the same.

A still further object is to provide the guide-arms with frictional devices in position to engage the sides of the tire of the rear wheel when so desired for retarding and regulating the speed of the bicycle.

A practical embodiment of my invention is represented in the accompanying drawings, in which—

Figure 1 represents a side view of a bicycle embodying my improvements, the stirrup and guide-arm being shown in full lines at the limit of their upward movement and in dotted lines, first, at the limit of their normal downward movement, and, second, at the limit of their downward movement when the driving-strap is broken. Fig. 2 is an enlarged detail side view of the driving mechanism and its adjacent parts, the stirrup and guide-arm being shown at the limit of their normal downward movement. Fig. 3 is a front view of the same, a portion of the bottom bracket and one of the guide-pulleys being shown in section. Fig. 4 is a top plan view of the parts shown in Figs. 2 and 3. Fig. 5 is an end view of one of the brake-spools which are attached to the guide-arms; and Fig. 6 is an enlarged detail view in section of a portion of the counterbalance-spring, showing the limiting-cord folded and concealed within the spring when the spring is not under tension.

The bicycle-frame is denoted as a whole by A, the front lower brace $a$ and rear lower braces $a'$ being shown in alinement, thereby bringing the bottom bracket $a^2$ of the frame up quite a distance from the ground and in line with the axle of the rear wheel and the connection of the front lower brace with the steering-head. The rear wheel is denoted by B, its rim by $b$, its tire by $b'$, its axle by $b^2$, and its hub by $b^3$. The bottom bracket $a^2$ is provided with a fixed axle C. Loose pulleys $c$ are mounted upon the opposite ends of the axle C, the said pulleys having a suitable ball-bearing thereon. The said pulleys are each provided with side flanges $c'$ along their peripheries for retaining the driving-straps to be hereinafter described.

A friction driving-clutch D is secured upon each side of the wheel B at the ends of its hub $b^3$, the said clutches being arranged to drive the wheel forward when they are rotated in one direction and to allow the wheel to continue its forward movement when they are rotated in the other direction. The driving-straps E are secured at their rear ends to the driving-clutches D, and from thence extend up along the rear brace-tubes $a'$ and over the guide-pulleys $c$, located at the bottom bracket $a^2$. The free ends of the straps E are provided with suitable stirrups $e$. The clutches D are provided with suitable springs, (not shown,) which exert their force to wind the driving-straps E around the peripheries of the clutches D and keep the stirrups $e$ normally at the limit of their upward movement adjacent to the guide-pulleys $c$. The downward movement of the stirrups $e$ draws the straps E forwardly, thereby driving the rear wheel B.

The forward movement of the straps E, and thereby the downward movement of the stirrups $e$, is limited in the following manner: A cross-bar F is secured to the rear lower braces $a'$ of the frame adjacent to the bottom bracket $a^2$, and the said cross-bar is provided with suitable eyes $f$, through which the straps E freely pass. The said straps E are each provided with a suitable stop $e'$ of sufficient size to engage the walls of the eye $f$, and thereby prevent the further forward movement of the strap. This stop $e'$ is preferably formed by inserting a small bar of yielding material—such, for example, as rubber—within the strap and securely fastening it.

The straps E are reinforced from a point adjacent to the stops $e'$ to the stirrups $e$, so as to render the said straps of great strength where it is mostly needed. The driving-straps E may be preferably made of strips of canvas secured firmly together.

The driving-straps E are guided in their upward and downward movements and held against undue lateral movement by means of a pair of guide-arms G, one upon each side of the bicycle. The rear end of each of the guide-arms G is pivoted upon the axle $b^2$ of the rear wheel B exterior to the rear lower braces. The said guide-arm preferably has a ball-bearing connection with the said axle, so as to reduce its friction thereon to a minimum. The free end of each of the guide-arms G is attached to one of the stirrups $e$, as shown at $g$. The guide-arms G are made preferably of tubular form and of spring metal, so that they may be sprung a slight distance inwardly for retarding the wheel in a manner to be hereinafter described. The guide-arms G are counterbalanced by suitable springs H, which extend between the rear lower braces $a'$ and the said guide-arms at points between their ends. These counterbalance-springs H are of sufficient power to counterbalance the weight of the guide-arms, so that the retracting-springs of the clutches D need only be of sufficient strength to wind up the driving-straps and thereby raise the stirrups to their upward limit. The downward movement of the guide-arms is limited, as has been hereinbefore set forth, by the engagement of the stops $e'$ with the cross-bar F.

The means which I have shown for preventing the guide-arms and stirrups from being forced down into engagement with the ground if the straps E should break between the stops $e'$ and the stirrups is as follows: Strong cords I are secured at their ends to the rear lower braces $a'$ and the guide-arms G. These cords are preferably secured at the same points as the counterbalance-springs H, and as the guide-arms are swung upwardly the said cords coil or fold themselves within the said springs, thereby being wholly concealed from view. These cords I are of such length that they will never come into use unless the straps E should break between the stops $e'$ and the stirrups. If the straps should break at the point above mentioned, the cords would only allow the guide-arms and stirrups to be depressed a very slight distance beyond their normal downward limit.

The means which I employ for retarding or braking the speed of the bicycle is as follows:

The retarding spools or rollers are mounted upon the guide-arms G at points upon opposite sides of the tire $b'$ of the rear wheel, the said spools or rollers being normally located a short distance away from the said tire. Each of the said spools or rollers preferably consists of two half-sections J J', secured together by two pairs of clamping-screws $j\ j'$. The guide-arm is preferably provided with a pair of sleeves $g'\ g^2$, between which the spool or roller is caused to embrace the guide-arm. The spool is preferably provided with a circumferential groove $j^2$, and it is clamped to the guide-arm so as to rotate with difficulty or under friction thereon. The amount of friction can be readily regulated by the operation of the screws $j\ j'$. When it is desired to retard the movement of the bicycle, the guide-arms G are sprung inwardly by the action of the rider's feet, thereby bringing the retarding-rollers into engagement with the opposite sides of the tire. The moment that the inward pressure upon the guide-arms is released the arms will spring outwardly, thereby removing the rollers from engagement with the tire. It will be seen that the brake can be readily applied in whatever position the arms may be, as the said arms are pivoted upon the axle of the rear wheel, so that the retarding-spools at all times are opposite the tire.

It will be seen that the guide-arms are not used for driving the bicycle, but are simply used for guiding the stirrups and for use in connection with controlling the movement of the wheel.

A bicycle as above described may be made in which the width of tread may be reduced to a minimum and in which the parts may be very strong structurally and at the same time reducing the number of parts. Furthermore, the guide-arms cause the stirrups to pass through an arc with the axle of the rear wheel as a center, thereby allowing the feet of the rider to pass through a graceful curve.

It is evident that any form of stirrup may be used and also that the driving-strap may be made of any suitable material. It is also evident that slight changes might be resorted to in the construction and arrangement of the several parts. Hence I do not wish to limit myself to the precise structure herein set forth; but

What I claim as my invention is—

1. In a bicycle, a suitable frame, a driving-wheel, a driving-clutch mounted on the hub of the driving-wheel, a guide-roller mounted on the frame, a driving-strap secured at one end to the clutch and provided with a stirrup at its opposite end, the said driving-strap being arranged to pass over the guide-roller, a cross-bar secured to the frame through which the strap passes and a stop on the strap adapted to engage the said cross-bar for limiting the downward movement of the stirrup, substantially as set forth.

2. In a bicycle, a suitable frame, a driving-wheel, a stirrup, means under the control of the stirrup for driving the said drive-wheel forwardly, a guide-bar pivoted to the frame to swing upwardly and downwardly having its free end in engagement with the stirrup for guiding it in its upward and downward movements and a brake carried by the said guide-bar in position to be engaged with the tire of the driving-wheel when the said bar is sprung inwardly, substantially as set forth.

3. In a bicycle, a suitable frame, a driving-wheel, a driving-clutch carried by the hub of the wheel, a guide-roller mounted on the frame, a driving-strap arranged to pass over the said guide-roller, the said driving-strap having one end engaged with the clutch and carrying a stirrup at its opposite end, a guide-bar pivoted upon the frame to swing upwardly and downwardly and having its free end engaging the stirrup to guide the stirrup in its upward and downward movements, a spring extending between the frame and the guide-bar for counterbalancing the guide-bar, and a cord extending between the frame and the guide-bar for limiting its downward movement, substantially as set forth.

ALEXANDER W. HALL.

Witnesses:
FREDK. HAYNES,
EDWARD VIESER.